United States Patent
Babbitt et al.

(10) Patent No.: US 6,618,757 B1
(45) Date of Patent: Sep. 9, 2003

(54) SYSTEM AND METHOD FOR DYNAMIC IP ADDRESS MANAGEMENT

(75) Inventors: Jeffrey G. Babbitt, Plano, TX (US); Hosame Abu-Amara, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/572,345

(22) Filed: May 17, 2000

(51) Int. Cl.$^7$ .................. G06F 15/173; G06F 15/16; H04L 12/28
(52) U.S. Cl. .................. 709/226; 709/227; 709/229; 370/431
(58) Field of Search .................. 709/226, 227, 709/229; 370/431

(56) References Cited

U.S. PATENT DOCUMENTS

| | | | | |
|---|---|---|---|---|
| 5,812,819 A | * | 9/1998 | Rodwin et al. | 703/23 |
| 6,012,088 A | * | 1/2000 | Li et al. | 709/219 |
| 6,178,455 B1 | * | 1/2001 | Schutte et al. | 709/228 |
| 6,185,184 B1 | * | 2/2001 | Mattaway et al. | 370/230 |
| 6,226,678 B1 | * | 5/2001 | Mattaway et al. | 709/230 |
| 6,381,646 B2 | * | 4/2002 | Zhang et al. | 709/227 |
| 6,381,650 B1 | * | 4/2002 | Peacock | 709/245 |
| 6,393,484 B1 | * | 5/2002 | Massarani | 709/227 |
| 6,427,170 B1 | * | 7/2002 | Sitaraman et al. | 709/226 |
| 6,490,289 B1 | * | 12/2002 | Zhang et al. | 370/401 |
| 6,529,517 B2 | * | 3/2003 | Hrastar et al. | 370/401 |
| 6,535,918 B1 | * | 3/2003 | Bender et al. | 709/228 |
| 6,542,935 B1 | * | 4/2003 | Ishii | 709/245 |

OTHER PUBLICATIONS

"The IP Network Address Translator (NAT)," Network Working Group, May 1994, written by K. Egevang and P. Francis.

"Dynamic Host Configuration Protocol," Network Working Group, Mar. 1997, written by R. Droms.

"An Empirical Model of HTTP Network Traffic," 1997 IEEE, pp. 592–600, Written by Bruce A. Mah.

"A Parameterizable Methodology for Internet Traffic Flow Profiling," IEEE Journal on Selected Area in Communications, vol. 13, No. 8, Oct. 1995, written by Kimberly C. Claffy, Hans–Werner Braun, and George C. Polyzos.

"Self–Similarity in World Wide Web Traffic: Evidence and Possible Causes," IEEE Journal on Selected Area in Communications, vol. 5, No. 6, Dec. 199y, written by Mark E. Crovella and Azer Bestavros.

"On the Relationship Between File Sizes, Transport Protocols, and Self–Similar Network Traffic," 1996 IEEE, written by Kihong Park, Gitae Kim, and Mark Crovella.

"Digital Cellular Telecommunications System (Phase 2+);" General Packet Radio Service (GPRS); Service Description; Stage 2 (GSM 03.60 version 7.3.0 Release 1998), ETSI EN 301 344 v7.3.0 (Dec. 1999).

* cited by examiner

Primary Examiner—Krisna Lim
(74) Attorney, Agent, or Firm—Haynes and Boone, L.L.P.

(57) ABSTRACT

An architecture for dynamic IP address management is disclosed. The architecture includes a gateway (GW) coupled between a private IP network and a public IP network. A dynamic host configuration processor (DHCP) is operatively coupled to the GW. A network address translator (NAT) couples to the GW. Lastly, a processor, operatively coupled to the GW and the DHCP, is provided for dynamically assigning to a private IP network subscriber equipment an external IP address and a corresponding IP address hold time as a function of an application to be performed. Assignment of the external IP address and a corresponding IP address hold time is in response to a) a request for accessing the public IP network by a subscriber equipment of the private IP network to perform the application, or b) a request for accessing the private IP network by an entity of the public IP network. The external IP address is selected from a prescribed number of external IP addresses available to the private IP network.

32 Claims, 5 Drawing Sheets

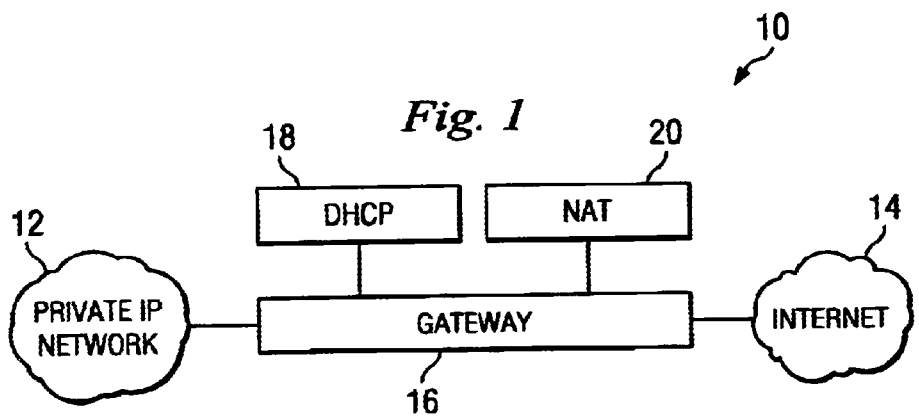
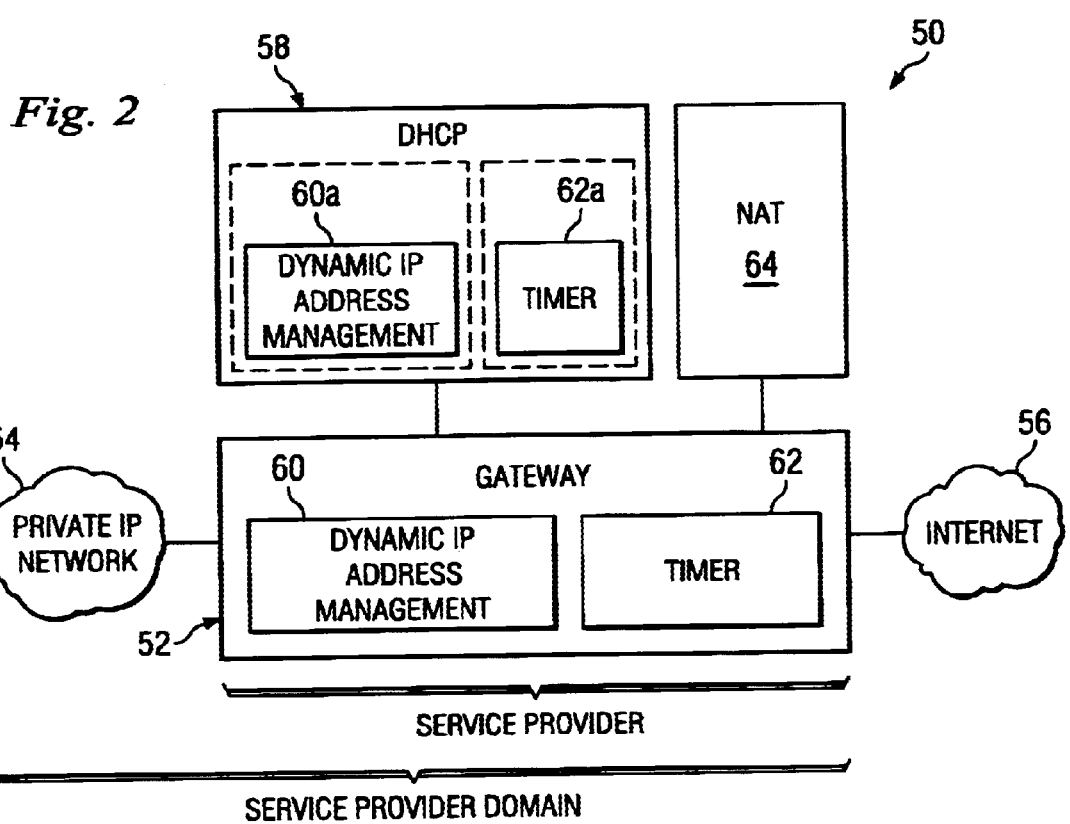

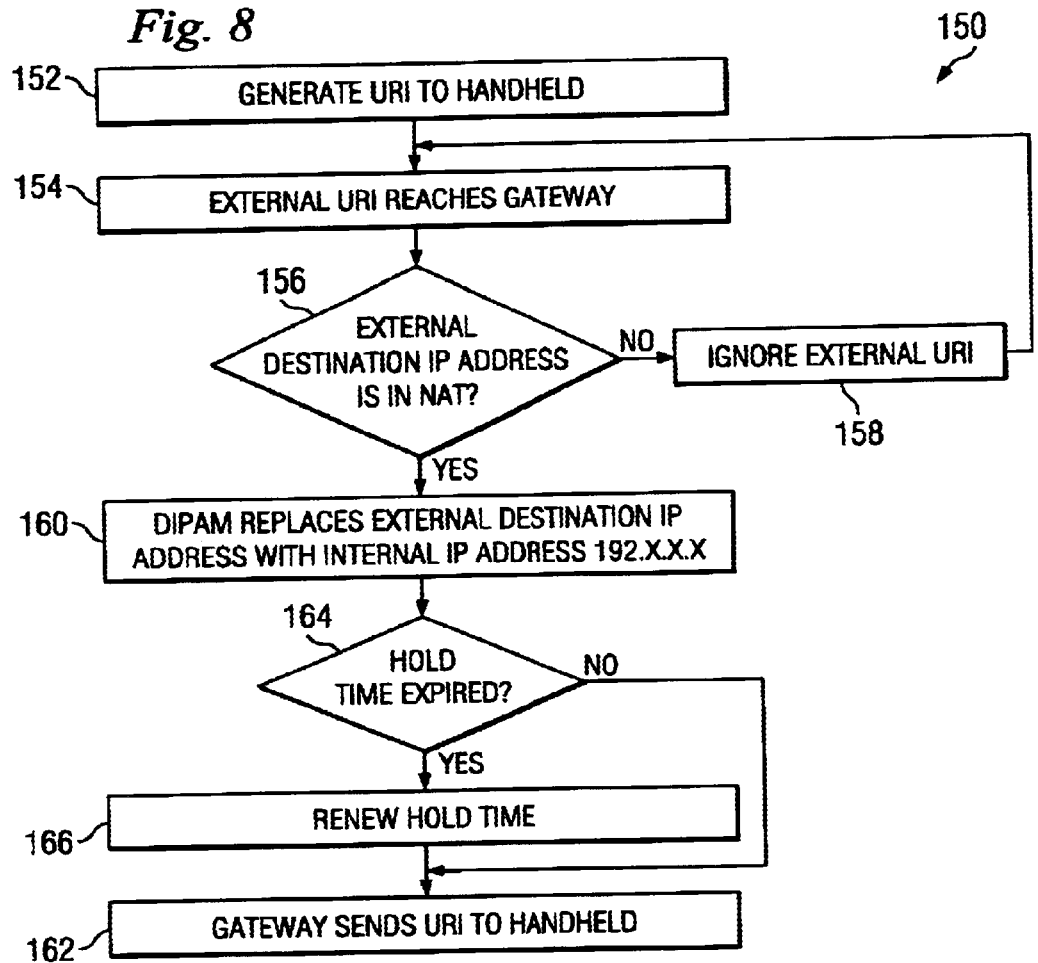
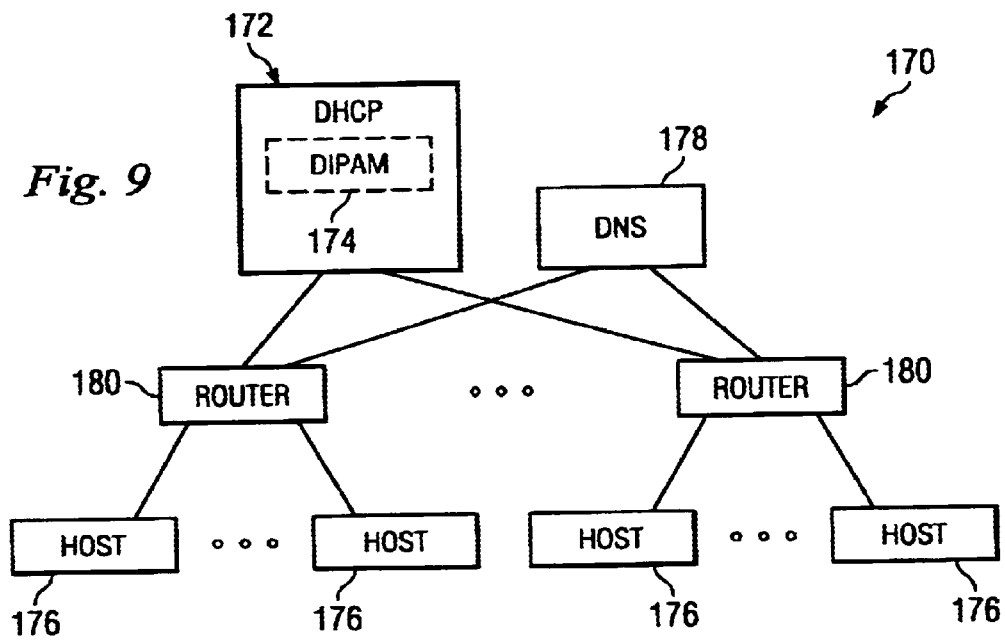

SYSTEM AND METHOD FOR DYNAMIC IP ADDRESS MANAGEMENT

BACKGROUND

The present invention relates generally to communication network technology and capacity enhancement in connection with coupling a private Internet Protocol (IP) network of a service provider to a public IP network, and more particularly, to a system and method for dynamic IP address management.

Communications service providers can include third generation (3G) terrestrial wireless providers, satellite service providers, Local Exchange Providers, long distance service providers, bandwidth (BW) resellers, enterprise service providers, or any other similar communications service provider. As the telecommunications services industry matures, it is highly probable that the communication service providers will offer some form of Internet based service.

When a service provider offers an Internet based service, the service provider must allocate IP addresses to its subscribers. As the number of Internet services proliferates and the number of users of these services increases exponentially, public IP addresses will become a scarce resource. Accordingly, IP address management will become a critical problem.

Currently, service providers assign private IP addresses (e.g. in the form of 192.x.x.x, where x represents any interger) to subscribers for use within the service provider's private network (or networks). Concurrent in time, more than one service provider may have assigned the same address to one of its respective subscribers or customers. Such an assignment of private IP addresses works fine if all of the respective user activities stay within the corresponding private network.

On the other hand, any request by a user to access the public Internet requires the assignment of a unique public IP address. In connection with accessing the public Internet, service providers have a prescribed set of public IP addresses available to assign to respective subscribers. Equipped with a public IP address, a subscriber may then access the public Internet.

FIG. 1 illustrates a current architecture 10 known in the industry. The current architecture 10 includes a private IP network 12 coupled to the public Internet 14 through a gateway (GW) 16. The service provider of the private IP network assigns public IP addresses to subscribers via a Dynamic Host Configuration Processor (DHCP) 18 and a Network Address Translator (NAT) 20. The NAT 20 maintains a table of entries for keeping track of current external (public) IP address(es) that are associated with an active subscriber's internal (private) address. When a private network subscriber desires to access the external Internet 14, the GW 16 sends a request to the DHCP 18. In response to the request, the DHCP 18 assigns an available unique external IP address for the respective subscriber to use for external activities. When the subscriber is finished (or ends an external Internet access session), the subscriber informs the GW 16. The GW 16 then sends a release message to the DHCP 18, wherein the external IP address is again made available for use.

In addition to the above, the service provider may associate a time limit with a particular external IP address, while allowing for extensions of time to be requested. In such an instance, the subscriber can request extensions if the subscriber needs the external IP address for a longer time duration. Unfortunately, this latter method puts control of the external IP address at the mercy of the subscriber.

A disadvantage of this prior method is that the critical limited resource of external IP addresses is not effectively managed and the external IP addresses are subject to becoming unavailable during high usage demand times.

Accordingly, a suitable method for Internet address management is needed.

SUMMARY

According to one embodiment, an architecture for dynamic IP address management includes a gateway (GW) coupled between a private IP network and a public IP network. A dynamic host configuration processor (DHCP) is operatively coupled to the GW. Lastly, a dynamic IP address management (DIPAM) processor is operatively coupled to the GW and the DHCP, for dynamically assigning to a private IP network subscriber equipment an external IP address and a corresponding IP address hold time as a function of an application to be performed. Assignment of the external IP address and a corresponding IP address hold time is in response to a) a request for accessing the public IP network by a subscriber equipment of the private IP network to perform the application or b) a request for accessing the private IP network by an entity of the public IP network. The external IP address is selected from a prescribed number of external IP addresses available to the private IP network.

A technical advantage is that the present embodiments provide an innovative architecture for dynamic IP address management for improving the efficiency of external IP address allocation.

BRIEF DESCRIPTION OF THE DRAWING

FIG. 1 illustrates a current network architecture known in the industry;

FIG. 2 illustrates a network architecture according to the present embodiments;

FIG. 8 is a flow diagram view illustrating another sequence of events according to another embodiment of the present disclosure; and FIG. 9 illustrates an embodiment of the present disclosure as it applies to a private network alone.

DETAILED DESCRIPTION

Figure 3:
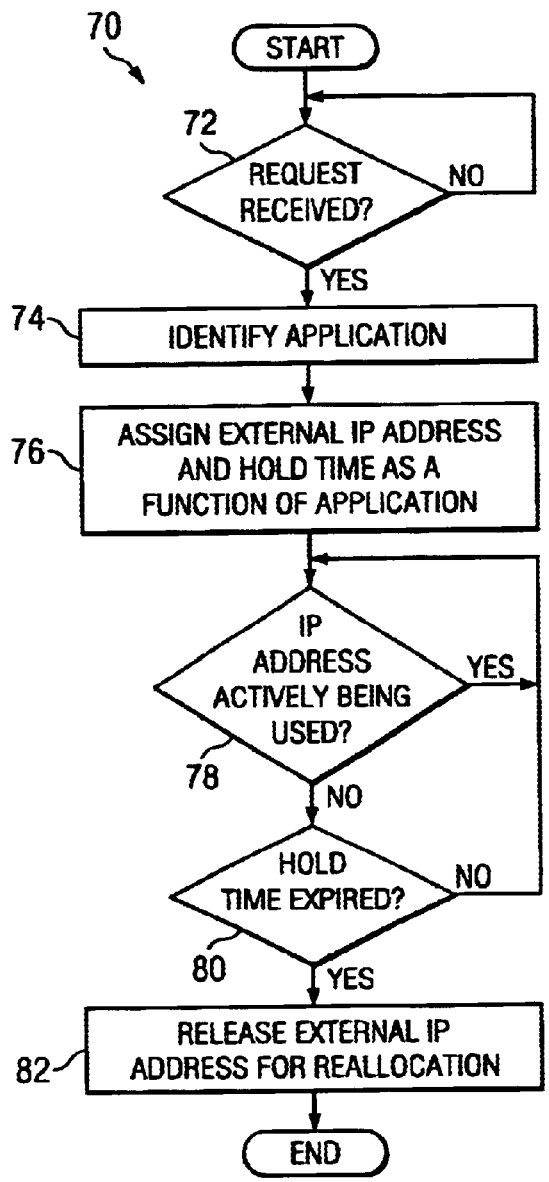
FIG. 3 is a flow diagram of one embodiment of the method of the present disclosure.

According to the present embodiments, a prescribed system unit of the private network, for example, the gateway (GW) or the dynamic host configuration processor (DHCP), manages the assignment of public IP addresses external to a private network.

In addition, a hold time is assigned to each external IP address, based upon application type. In this manner, the service provider can more efficiently manage and dynamically control assignment of external IP addresses.

Referring now to FIG. 2, an architecture 50 for dynamic IP address management includes a gateway (GW) 52 coupled between a private IP network 54 and a public IP network 56. A dynamic host configuration processor (DHCP) 58 couples to the GW 52. Lastly, an address assignment means 60, operatively couples to the GW 52 and the DHCP 58, for dynamically assigning to a private IP network subscriber equipment an external IP address and a corresponding address hold time as a function of an application to be performed. In one embodiment, the external IP address assignment means includes a suitable processor or computer, the processor or computer being programmed using programming techniques known in the art for performing the various functions discussed herein. Such an assignment of an external IP address is in response to I) a request for accessing the public IP network by a subscriber equipment of the private IP network 54 to perform the application or ii) a request for accessing the private IP by an entity of the public IP network. The external IP address is selected from a prescribed number of external IP addresses available to the private IP network.

The dynamic external IP address assigning means 60 further includes means for determining whether the IP address is actively being used by the subscriber. Responsive to a determination that the IP address is not actively being used, the external IP address assigning means 60 determines whether the hold time has expired. Responsive to an expiration of the hold time, the IP address assigning means releases the assigned IP address for reallocation. A suitable timer 62 is provided to perform two functions: monitor a given hold time and determine whether an IP address is actively being used by the subscriber. Lastly, a Network Address Translator (NAT) 64 maintains a table of entries for tracking current external (public) IP address(es) that are associated with an active subscriber's internal (private) address.

According to one embodiment, the dynamic external IP address assigning means 60a is resident within the DHCP 58. The dynamic external IP address assigning means 60a further includes a timer 62a for monitoring an expiration of an assigned IP address hold time. Responsive to a request, the DHCP 58 determines an assigned IP address hold time as a function of the application. Further responsive to the request, the DHCP 58 notifies the GW 52 of the assigned IP address and the assigned IP address hold time. A timer 62, in this embodiment, will still be needed in the GW 52. The timer 62 records the IP address hold time. In addition, the timer 62 monitors subscriber traffic to determine whether an IP address is actively being used by the subscriber. In a preferred embodiment, the timer 62 monitors packets sent to or sent by the subscriber as they pass through the GW 52. As long as the delay between every two consecutive packets of the subscriber is within a prescribed amount of time (determined by the application), timer 62 considers the IP address of the subscriber to be active. If the hold time for the IP address expires while the IP address is active, timer 62 automatically renews the hold time for the IP address and requests the DHCP timer 62a to renew the hold time for the IP address. Responsive to the expiration of the assigned IP address hold time, when the IP address is not active, the DHCP 58 releases the assigned external IP address for reallocation.

In another embodiment, the dynamic external IP address assigning means 60 is resident within the GW 52. Responsive to a request, the GW 52 determines an assigned IP address hold time as a function of the application. Further responsive to the request, the GW 52 submits the request to the DHCP 58. The DHCP 58 then notifies the GW 52 of the assigned IP address. In one embodiment, the dynamic external IP address assigning means 60 includes a timer 62 for determining whether an IP address is actively being used by the subscriber and for monitoring an expiration of an assigned IP address hold time. In a preferred embodiment, the timer 62 monitors packets sent to or sent by the subscriber as they pass through the GW 52. As long as the delay between every two consecutive packets of the subscriber is within a prescribed amount of time (determined by the application), timer 62 considers the IP address of the subscriber to be active. If the hold time for the IP address expires while the IP address is active, timer 62 automatically renews the hold time for the IP address. Responsive to the expiration of the assigned IP address hold time, when the IP address is not active, the GW 52 communicates information to the DHCP 58 for releasing the assigned external IP address for reallocation. Note that, unlike the previous embodiment, a timer 62a is not needed.

The architecture for dynamic IP address management may also include a gateway (GW), a dynamic host configuration processor (DHCP), a dynamic IP address management (DIPAM) processor, and a network address translator (NAT). The GW couples between a private IP network and a public IP network. The dynamic host configuration processor (DHCP) couples to the GW. The DIPAM processor operatively couples to the GW and the DHCP for dynamically assigning an external IP address and a corresponding address hold time. The DIPAM processor dynamically assigns the external IP address and a corresponding address hold time as a function of an application to be performed and in response to a request for accessing the public IP network by a subscriber of the private IP network to perform the application or in response to a request for accessing the private IP network by an authorized entity of the public IP network to perform the application. The DIPAM processor selects the external IP address from a prescribed number of external IP addresses available to the private IP network. Lastly, the DIPAM processor consults the NAT to translate correctly between public IP addresses and private IP addresses so that packets are sent to correct destinations. The NAT couples to the GW.

According to a method of the present disclosure, implementing dynamic IP address management includes providing a gateway, providing a dynamic host configuration processor (DHCP) coupled to the GW, providing a network address translator (NAT) coupled to the GW, and providing a dynamic IP address management (DIPAM) processor. The gateway (GW) couples between a private IP network and a public IP network. The DIPAM processor operatively couples to the GW and the DHCP. The processor dynamically assigns an external IP address and a corresponding address hold time as a function of an application to be performed, in response to a request for accessing the public IP network by a subscriber of the private IP network to perform the application or in response to a request for accessing the private IP network by an authorized entity of the public IP network to perform the application. The processor selects an external IP address from a prescribed number of external IP addresses available to the private IP network. The DIPAM processor consults the NAT to translate correctly between public IP addresses and private IP addresses so that packets are sent to correct destinations.

Another method of implementing dynamic IP address management includes providing a gateway (GW) coupled between a private IP network and a public IP network. A dynamic host configuration processor (DHCP) couples to the GW. A network address translator (NAT) couples to the GW. Lastly, a DIPAM processor is provided. The DIPAM processor operatively couples to the GW and the DHCP for dynamically assigning an external IP address and a corresponding address hold time. The DIPAM processor assigns the external IP address and corresponding address hold time as a function of an application to be performed and in response to a request for accessing the public IP network by a subscriber of the private IP network to perform the application or in response to a request for accessing the private IP network by an authorized entity of the public IP network to perform the application. The processor selects the external IP address from a prescribed number of external IP addresses available to the private IP network. The DIPAM processor consults the NAT to translate correctly between public IP addresses and private IP addresses so that packets are sent to correct destinations. The processor is further for determining whether the IP address is actively being used by the subscriber. Responsive to a determination that the IP address is not actively being used, the processor determines whether the hold time has expired. Responsive to an expiration of the hold time, the processor releases the assigned IP address for reallocation.

Turning now to FIG. 3, a method 70 of the present disclosure begins by awaiting a request for accessing the public IP network by a subscriber (or user) of the private IP network to perform an application (Step 72). In response to receipt of a request to access the public IP network, the method proceeds to Step 74. In Step 74, the application that the subscriber desires to perform is identified. For example, the application may include HTTP, FTP, TELNET, email, or other application. Identification of a given application can be established, for example, by investigating an application ID contained in an IP header or as otherwise transmitted.

In response to identification of the application, an external IP address and hold time are assigned to the user in Step 76. That is, a given external IP address and hold time are assigned as a function of the particular application being requested. For example, if the application is HTTP, a hold time on the order of 180 seconds may be assigned. The correspondence between the private IP address of the subscriber and the assigned IP address is recorded in the NAT. In Step 78, the external address is checked to determine whether or not it is being actively used. If yes, then the process repeats Step 78, so long as the external address is actively being used. On the other hand, if the external IP address is not being actively used, the process advances to Step 80.

In Step 80, a determination is made whether or not the hold time has expired. If the hold time has not yet expired, then the process returns to Step 78 for again checking whether or not the external IP address is actively being used. If, in Step 80, the hold time has expired, then the external IP address is released in Step 82 for reallocation to another user. Also, in Step 82, DIPAM requests the NAT to discard the record of the correspondence between the private IP address of the subscriber and the assigned IP address. The process then ends.

An alternative and simpler implementation for Steps 78 and 80 result in an interrupt driven implementation. As with the previously described implementation, a timer is initiated for each user's request. If a timer expires, the IP address is released and allowed to be reused. If a user request is received and there is an IP address assigned, the timer is reset. This eliminates the need to monitor if an IP address is being actively used since, by definition, an IP address is being used if the timer has not expired.

Accordingly, the method and apparatus of the present embodiments associate an external IP address with a subscriber only while the subscriber is actively using the external IP address. If an IP address has been assigned and is not being actively used, the service provider takes the IP address away and makes it available for assignment to a different subscriber. In this manner, additional subscribers can be more readily serviced with the finite external IP address list. An example of GW is the GPRS GGSN (i.e., General Packet Radio Service (GPRS) Gateway GPRS Support Node (GGSN)) in the wireless GSM standard.

In connection with understanding advantages of the present embodiments, let us consider traffic modeling. Traffic modeling often requires descriptions of traffic at multiple levels of time granularity. Different types of traffic may be described most effectively by a different number of levels. File Transfer Protocol (FTP) traffic, for example, is the result of opening an FTP session, initiating a data connection (sometimes multiple connections), and transferring a stream of IP packets. However, it may not be useful to consider electronic mail (i.e., email) traffic in a same manner. That is, email traffic is transmitted when an end-user decides to send a message, at which time, a connection is initiated. Accordingly, the concept of a "session" which is pertinent to FTP sessions is no longer relevant with reference to different types of traffic such as email or electronic mail.

World Wide Web (WWW) traffic requires further abstraction. HTTP is the protocol used to encapsulate WWW traffic. End-users surf the web using Web Browser software. Each web browsing "session" is comprised of transferring a series of web pages. Each web page is made up of multiple URIs (uniform resource identifiers). A URI can correspond, for example, to text or to in-line images. We may think of URIs as files that, in some versions of HTTP, require individual connections.

Figure 4:
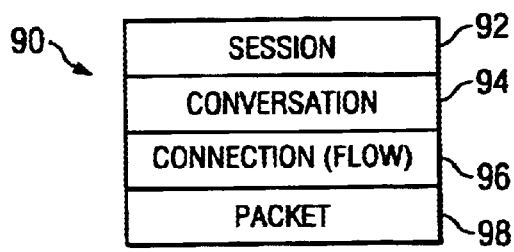
FIG. 4 illustrates a framework characterization of IP network traffic.

As illustrated in FIG. 4, in connection with the present embodiments, the following framework 90 characterizes IP traffic as it is currently known. A subset of the proposed levels 90 may be appropriate for different types of traffic.

Session Level: A session 92 is characterized by a period of application activity, during which an end user is producing and consuming traffic. An example of a session includes an FTP or WWW session, or the time an end user spends using a web browser application. Session metrics include: 1) session lengths (e.g., in units of minutes); and 2) session interarrivals (e.g., in units of minutes).

Conversation Level: A conversation 94 is characterized by a series of connections within a session. Connections typically overlap, or arrive in rapid succession. An exemplary conversation includes the transfer of a web page containing multiple URIs. In such an example, each URI requires its own TCP (Transport Control Protocol) connection, producing a set of individual "flows." Conversation metrics include: 1) conversation length (e.g., in units of the number of connections); and 2) conversation interarrivals (e.g., in units of seconds).

Connection (Flow) Level: A connection 96 is defined as a flow of IP packets. Exemplary connections include FTP-data sessions, HTTP requests and/or replies, and email transfers. Connection metrics include: 1) connection size (e.g., in units of bytes); 2) connection packets (e.g., in units of the number of packets); 3) connection duration (e.g., in units of seconds); and 4) connection interarrivals (e.g., in units of seconds).

Packet Level: Packets 98 are characterized as Internet (IP) packets within a connection (or flow). Packet metrics include: 1) packet interarrivals (e.g., in units of milliseconds (ms)); and 2) packet lengths (e.g., in units of bytes).

With the embodiments of the present disclosure, a subscriber is assigned (and able to keep) an external IP address only for as long as a conversation is active. For example, a conversation occurs each time a web document is transferred. Transfer of a web document (alternatively, a web document transfer event) corresponds, in many instances, to multiple file transfers. The multiple file transfers correspond, in turn, to multiple connections. The multiple connections usually include at least one connection for some HTML text and other connections for in-line images.

Further in connection with the above, another characteristic or metric includes "Think Time." "Think Time" is a metric used in the art to describe the time duration between document transfers. "Think Time" is particularly interesting because it is not tied to any particular protocol. Namely, as newer versions of HTTP are developed for streaming document transfers in innovative ways, "Think Time" may not be effected since the forces that govern how often a subscriber clicks (e.g., selects a hyperlink) will still be at work.

According to the present embodiments, the DIPAM processor of the GW and/or the DHCP dynamically control assignment of the external IP addresses of a service provider in a prescribed manner. Dynamically controlling the assignment of external IP addresses allows for an increased number (in some instances, a maximum number) of subscribers to use a finite list of external IP addresses of the service provider. Dynamic control can be accomplished as discussed in the following.

In one embodiment, the DIPAM processor of the DHCP performs the dynamic control. Currently, a request to the DHCP for accessing the external IP network does not contain an application to be used. According to one embodiment of the present disclosure, a request to access the external IP network includes an application, or an identification of the application. In response to application or an identification of the application, the DHCP assigns an external IP address and an expiration time for the respective IP address as a function of the application. A different external IP address may be required for different applications at different times. The DHCP maintains and/or keeps the respective expiration timers. Upon the expiration of a given timer, the DHCP issues and/or sends a suitable notice (e.g., an expiration or termination notice) to a respective subscriber.

In another embodiment, the DIPAM processor of the GW performs the dynamic control. In response to receipt of an external Internet request containing an application, the GW requests an external IP address from the DHCP for an appropriate amount of time based upon (or as a function of) the application. The timer may be in the DHCP or GW. Upon expiration of the timer, the GW informs the appropriate parties and initiates release of the external IP address with the DHCP. Upon release of the external IP address, the address becomes available for use by a subscriber.

In contrast to the existing art, the external IP addresses, assigned by the architecture of the present embodiments, are assigned and remain assigned for a prescribed duration that a subscriber actively uses the external IP address. In response to a determination that a subscriber does not actively use the IP address (i.e., upon detection of inactive use ), the IP address is released from the subscriber for use by other subscribers. Accordingly, a subscriber may be assigned multiple IP addresses during a given session, whereas, in the existing art, a subscriber is assigned an external IP address for an entire session, regardless of whether or not the subscriber actively uses the address.

The present embodiments further include a method for determining how many IP addresses will be needed for a service provider implementing Dynamic IP Address Management (DIPAM) as disclosed herein. A preliminary answer would be that the Internet Service Provider (ISP) will need at least one IP address for each active subscriber in a Busy Hour (BH). According to the present embodiments, however, the DIPAM can reduce overall external IP address requirements.

Given a number of active subscribers (X) in a BH, the average number of external IP addresses used by each subscriber and a respective IP holding time (IPHT) of each address is needed. Armed with such information, the number of IP addresses required can be calculated.

Consider the following exemplary three-step procedure which can be used to arrive at a conclusion.

Step 1: Determine what each active BH subscriber is doing and what type of applications the subscriber is using. For this analysis, it is assumed that each active BH subscriber is: a) sending or receiving two (2) email messages; b) performing one (1) file transfer protocol (FTP); and c) surfing the web for fifteen (15) minutes.

Step 2: Determine I) how many external IP addresses are needed for each activity and ii) the IPHT for the IP address of each activity. For this analysis, it is assumed that there is: a) one (1) IP address per email message with a corresponding IP hold time assumed to be on the order of five (5) seconds; b) one IP address per FTP with a corresponding IP hold time assumed to be on the order of sixty (60) seconds; and c) there exists some prescribed number of IP addresses per Web browsing session with corresponding prescribed values of IPHTs, calculated as disclosed in Steps 2a and 2b.

Figure 5:
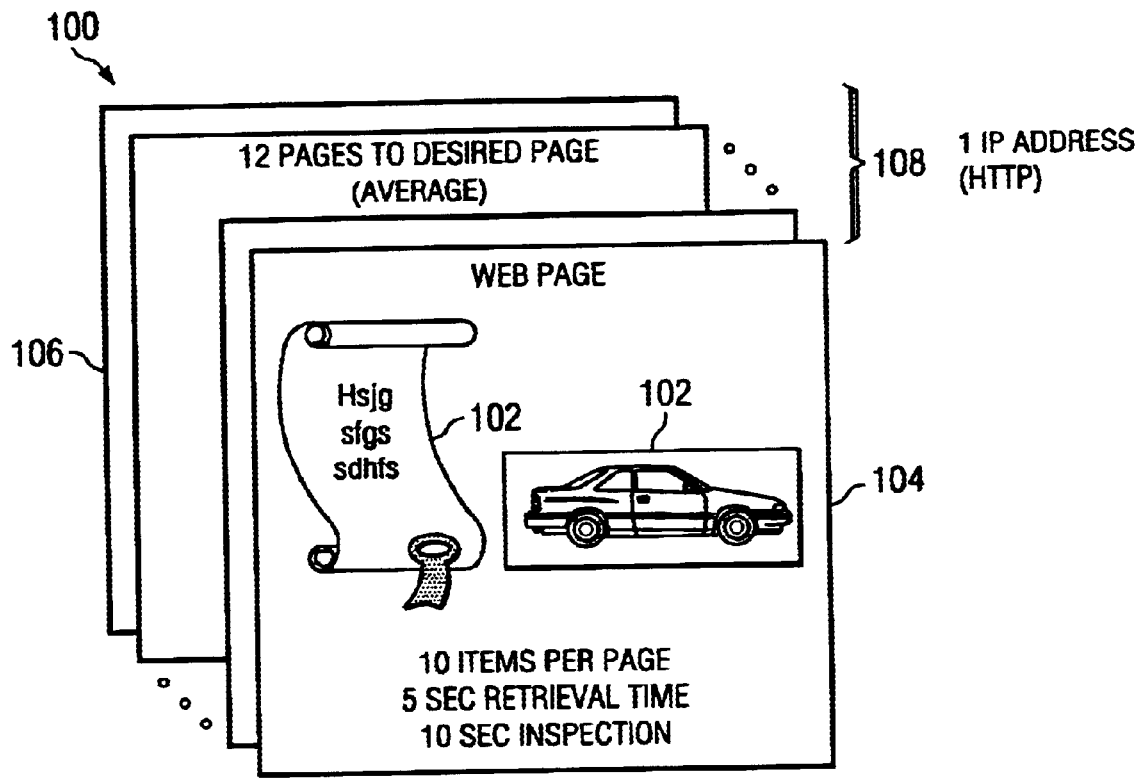
FIG. 5 illustrates an exemplary Web Browsing session.

Step 2a: The method includes inspecting or studying a typical Web Browsing session closer. That is, with information derived from previous studies and assumptions, the method may assume that each typical Web Page contains ten (10) URIs and twelve (12) pages (i.e., links) to get to a desired page. FIG. 5 illustrates such an exemplary Web Browsing session 100.

In connection with a portion of an exemplary Web Browsing session 100 as illustrated in FIG. 5, assume that the URIs 102 are retrieved two (2) at a time. Further assume one second (1-sec) retrieval time per URI. Accordingly, there is a retrieval time on the order of five seconds (5-sec) per page 104. Furthermore, assume a ten second (10-sec) inspection of each page to find a next link and twelve (12) pages to get to a desired page 106. The result is one hundred eighty (180) seconds to get to the desired page 106 (i.e., 12*(5+10)=180).

Still further, in connection with the portion of the exemplary Web Browsing session 100 of FIG. 5, assume two hundred forty (240) seconds for inspecting the desired page. As a result, a total of seven (7) minutes is needed for the Web Browsing session 100 per desired page (240 sec+180 sec= 420 sec (or 7 min)). Accordingly, one IP address 108 can be held for the entire portion of the Web Browsing session, or upon expiration of 180 sec, the IP address 108 will be lost while inspecting the final desired page.

Step 2b: The method now estimates how many IP addresses are needed for a typical Web Browsing session. Using the assumed fifteen (15) minute session time and dividing by 7 minutes per session (from Step 2a) results in approximately two (2) IP addresses per Web Browsing session. To be on the conservative side, assume 4 IP addresses per Web Browsing session (e.g., some subscribers may get to the desired page faster or alternatively, they may get sidetracked on the way to the desired page) with an IP hold time (IPHT) of 180 seconds for each IP address.

Step 2c: Putting it all together, each active BH subscriber needs seven (7) external IP addresses with an average IPHT of one hundred thirteen (113) seconds (corresponding to a weighted average of the IPHTs as shown below). For the weighted average analysis, it is assumed that there is: a) one (1) IP address per email message with a corresponding IP hold time assumed to be on the order of five (5) seconds; b) one IP address per FTP with a corresponding IP hold time assumed to be on the order of sixty (60) seconds; and c) four (4) IP addresses per Web browsing session with a corresponding IPHT assumed to be on the order of one hundred eighty (180) seconds for each IP address.

Step 3: The method further uses the well known Erlang-B formula to calculate total number of IP addresses needed. For example, one incarnation of the Erlang-B formula returns the number of trunks given the number of Erlangs and blocking.

Trunks=$f$(Blocking, Erlangs)

In the system of the present embodiments:

Trunks=$IP$ addresses

Erlangs=$IP$ address time=(7 IPs/Sub * $X$ subs * 113 Sec/IP)/3600 Sec

Accordingly, use of the Erlang-B formula and the previous inputs have shown that external IP addresses needed is on the order of X/5. This result is surprisingly insensitive to blocking. In addition, the result is linear. For example, if IPHT is cut in half, then the number of IP addresses needed becomes equal to X/10. Also for example, if 7 IPs/sub is increased to 14 IPs/sub, then the number of IP addresses needed becomes equal to X/2.5.

As discussed above, Step 3 uses the Erlang-B formula to calculate the total number of IP addresses needed. Accordingly, the IP hold time is assumed to be exponentially distributed. However, in an article by Crovella et al. (Crovella, M. E. and Bestavros, A., "Self-Similarity in World Wide Web Traffic: Evidence and Possible Causes," *IEEE/ACM Transactions on Networking*, Vol. 5, No. 6, pp. 835–846, December 1997), the traffic generated by WWW transfers shows self-similar characteristics. In particular, the distribution of file sizes in the Web can be heavy-tailed. In addition, reliable transmission and flow control of TCP, which WWW uses, introduces self-similar distributions in the transfer delay for Web pages. Accordingly, while the Erlang-B formula can be used as discussed above, there may exist other suitable methods to calculate the total number of IP addresses needed.

With respect to the present embodiments, the method of the present disclosure is implemented with equipment, selected in a prescribed manner, such that any impact of delay in obtaining an IP address due to the DIPAM on response time experienced by the end users of WWW and FTP applications is minimized. In addition, the impact of DIPAM on GW capacity, performance, and load is also desired to be minimized. The implications of DIPAM on network planning, capacity, sizing, and provisioning are appropriately optimized according to a desired system implementation of a service provider.

Figure 6:
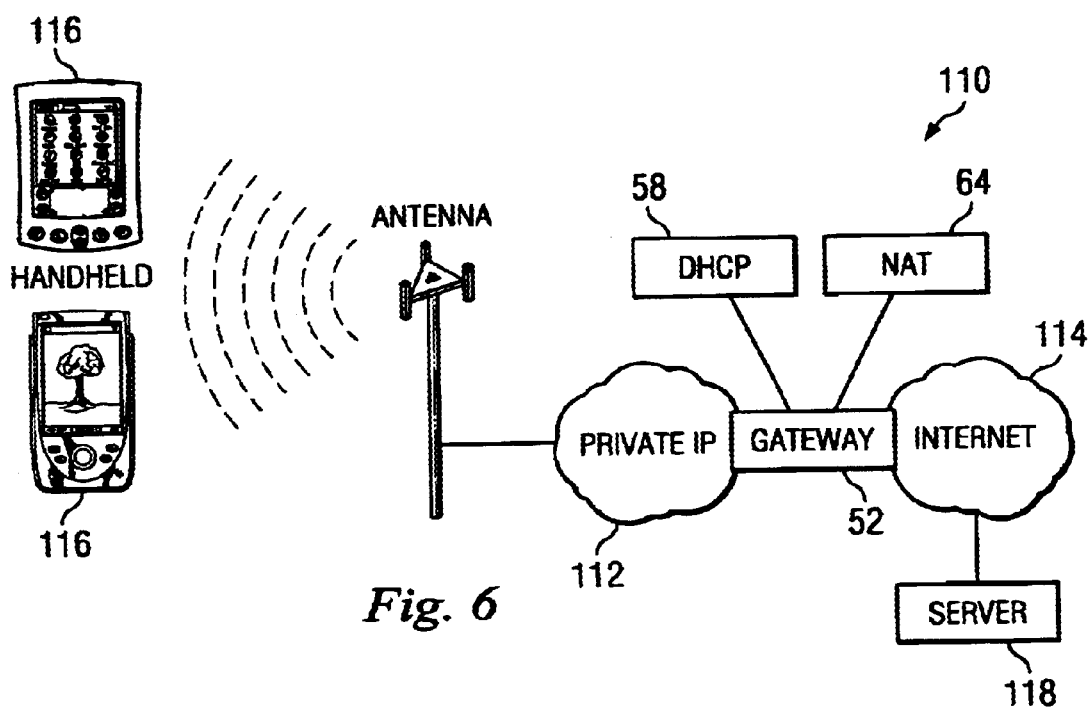
FIG. 6 illustrates an exemplary implementation according to an embodiment of the present disclosure.

Turning now to FIG. 6, an exemplary implementation 110 according to one embodiment of the present disclosure is shown. The private network 112 is a wireless provider network, e.g. a GSM GPRS wireless network. The private network provides various services, among which include access to the Internet 114. Users of the private network may use handheld devices 116, for example, to access desired web pages. The web pages can be located on servers 118 connected to the Internet 114, or may be located on servers (not shown) located in the private network.

In the example of FIG. 6, each handheld device 116 has an internal IP address 192.X.X.X assigned by the wireless provider 112 (where X includes three digits each from 0–9). According to current implementations of WWW, handheld devices 116 use the HTTP protocol to access web pages. HTTP is encapsulated in IP packets. According to IP standards, each IP packet carries source and destination IP addresses. Hence, each IP packet that encapsulates HTTP in the private network carries the internal source IP address of the handheld and the destination IP address of the web server.

Figure 7:
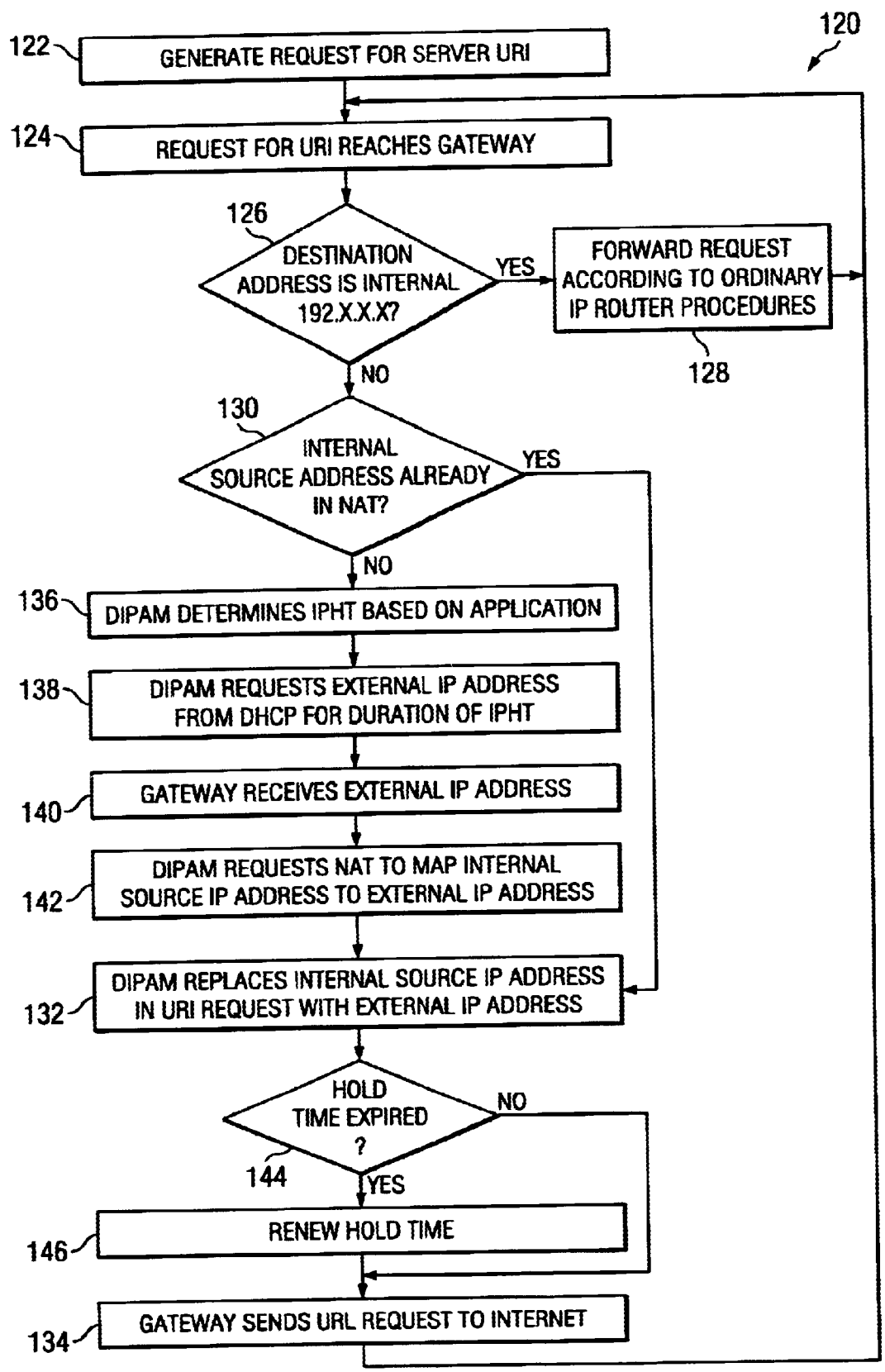
FIG. 7 (7a and 7b) is a flow diagram view illustrating a sequence of events according to an embodiment of the present disclosure.

Turning now to FIG. 7, a flow chart 120 exemplifies a sequence of events for the user of the private network (as discussed with respect to FIG. 6) to request a web page, according to an embodiment of the present disclosure. In current designs of web pages, each web page includes at least several URIs. Hence, the handheld 116 (FIG. 6) generates an HTTP request for a URI in the desired web page (Step 122). The request is carried over the private network in accordance with relevant wireless network mechanisms towards the GW (Step 124).

An example of a GW is the GSM GPRS GGSN gateway. When the IP packet that encapsulates the request for the URI reaches the GW, the DIPAM in the GW examines the destination address of the IP packet (Step 126). If the destination address is an internal 192.X.X.X address, then the DIPAM performs no special processing. In other words, the GW forwards the IP packet to the internal destination address according to ordinary IP router procedures (Step 128). This corresponds to the case where the desired web page is on a server located within the private network.

In reference again to Step 126, if the destination address is not an internal 192.X.X.X address, then the DIPAM makes a determination whether an external IP address has already been assigned to the handheld (Step 130). In particular, the DIPAM makes the determination by consulting the NAT. If an external IP address has already been assigned to the handheld, then the GW replaces the internal source IP address in the packet with the external IP address (Step 132). The DIPAM then makes a determination whether the hold time for the external IP address has expired (Step 144). If the hold time for the external IP address has not expired, then the GW forwards the newly modified packet to the Internet, where the packet is routed according to current Internet implementations to the destination server (Step 134). In reference again to Step 144, if the hold time for the external IP address has expired, then the DIPAM renews the IP hold time for the IP address (Step 146). The GW then forwards the newly modified packet to the Internet, where the packet is routed according to current Internet implementations to the destination server (Step 134).

In reference again to Step 130, if an external IP address has not been assigned to the handheld, then the DIPAM examines the contents of the IP packet to determine the type of application encapsulated in the IP packet. Responsive to determining the type of application, the DIPAM assigns an appropriate IPHT (Step 136). In the example of FIG. 6, having determined that the application is an HTTP application, the DIPAM selects an appropriate IPHT for HTTP from an IPHT lookup table. The IPHT lookup table is created off-line and can be adjusted as the system administrator deems necessary. The DIPAM then requests an external IP address from the DHCP for the duration of IPHT (Step 138).

In accordance with current implementations of DHCP, the DHCP assigns an external IP address and sends the external IP address to the GW (Step 140). In response, the DIPAM requests the NAT to store the correspondence between the handheld internal IP address and the newly assigned external IP address (Step 142). The GW then replaces the internal source IP address (Step 132) in the packet with the newly assigned external IP address. The DIPAM then makes a determination whether the hold time for the external IP address has expired (Step 144). If the hold time for the external IP address has not expired, then the GW then forwards the newly modified packet to the Internet, where the packet is routed according to current Internet implementations to the destination server (Step 134). In reference again to Step 144, if the hold time for the external IP address has expired, then the DIPAM renews the IP hold time for the IP address (Step 146). The GW then forwards the newly modified packet to the Internet, where the packet is routed according to current Internet implementations to the destination server (Step 134).

FIG. 8 shows a flow chart 150 of another exemplary sequence of events for a server attached to the Internet for sending a URI to the handheld, as discussed with reference to FIGS. 6 and 7, according to an embodiment of the present disclosure. In accordance with current implementations of HTTP, the server 118 generates an HTTP response in Step 152 to the HTTP request from the handheld 116 discussed in FIG. 6. The response is encapsulated in an IP packet with a source address corresponding to the server IP address, and a destination address corresponding to the handheld external IP address. The IP packet is routed according to current Internet implementations to the GW (Step 154).

When the IP packet reaches the GW, the DIPAM makes a determination whether the external IP address of the handheld is still present in the NAT (Step 156). If the external IP address of the handheld is not in the NAT, then the GW discards the IP packet (Step 158). This corresponds, for example, to a case where the handheld 116 turned its power off immediately after sending a URI request. In reference again to Step 156, if the external IP address of the handheld is still in the NAT, then the GW replaces the external destination IP address in the packet with the internal IP address of the handheld (Step 160). The DIPAM then makes a determination whether the hold time for the external IP address has expired (Step 164). If the hold time for the external IP address has not expired, then the GW then forwards the newly modified packet to the handheld 116 in accordance with relevant wireless network mechanisms (Step 162). In reference again to Step 164, if the hold time for the external IP address has expired, then the DIPAM renews the IP hold time for the IP address (Step 166). The GW then forwards the newly modified packet to the handheld 116 in accordance with relevant wireless network mechanisms (Step 162).

Accordingly, a novel methodology and architecture have been disclosed that enable service providers to provide public Internet access to subscribers while managing a limited number of public IP addresses. The new approach, referred to herein as DIPAM, assigns an IP address only when a user actively uses the IP address. Responsive to a determination that a subscriber does not actively use a given IP address (or detection of inactive use), the IP address is released for use by other subscribers. A user may accordingly be assigned multiple IP addresses during a given Web browsing session, whereas, in the prior art, a subscriber is assigned an IP address for an entire Web browsing session, regardless of whether or not the subscriber actively uses the address. The use of DIPAM advantageously reduces IP address requirements, especially when compared with the naive method of assigning IP addresses for each active user in a busy hour.

As discussed herein above, the embodiments have been concerned with using the DIPAM for private network to public network situations. The present embodiments can also be applied to a private network (PN) alone. In current private networks, IP address are assigned to hosts (i.e., subscriber computers or equipment) as long as the hosts are turned on (i.e., power "ON"). The present embodiments solve the problem when there are more hosts than addresses available within the private network.

FIG. 9 illustrates an embodiment of the present disclosure as it applies to a private network (PN) 170 alone. In the embodiment of FIG. 9, a DHCP 172 includes a DIPAM 174. The DIPAM 174 assigns IP addresses to hosts 176 as long as the hosts 176 are being actively used. More particularly, assignment of IP addresses is carried out in a similar manner as discussed herein with respect to the embodiments for private network to public network Internet communications.

In the embodiment of the private network 170 of FIG. 9, the DIPAM 174 also selects an IPHT. The IPHT may or may not be based on application. For example, the DIPAM 174 can assign a single IPHT for any use or type of application on the private network 170. In addition, a Domain Name Server (DNS) 178 is used instead of a NAT, as in the private network to public network configuration. The DNS 178 maintains a correlation between host name and assigned IP address. For implementation, suitable hardware changes are made to the routers 180, as necessary.

As illustrated in FIG. 9, the private network 170 includes a DHCP coupled to a plurality of routers 180. DNS 178 also couples to the routers 180. Routers 180 facilitate communication between the plurality of hosts 176, DHCP 172, and DNS 178.

In operation, with respect to the embodiment of FIG. 9, when a host requests use of the network, the host is assigned an IP address. If the IP address is being actively used, then the address is retained. If the host is not actively using the assigned IP address, then the IP address can be taken away from that host and reused for an active host. If after some time of network inactivity, the network is again accessed by the host, then the initial IP address would have been taken away and a new address will be requested. Accordingly, the private network 170 can maintain more hosts than available IP addresses. This embodiment is an improvement over current technology which limits the number of hosts to be less than or equal to the number of available IP addresses.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An architecture for dynamic IP address management, comprising:
   a gateway (GW) coupled between a private IP network and a public IP network;
   a dynamic host configuration processor (DHCP) coupled to said GW; and
   means, operatively coupled to said GW and said DHCP, for dynamically assigning to a private IP network subscriber equipment an external IP address and a corresponding address hold time as a function of an application to be performed, in response to a) a request for accessing the public IP network by a subscriber equipment of the private IP network to perform the application or b) a request for accessing the private IP network by an entity of the public IP network, the external IP address selected from a prescribed number of external IP addresses available to the private IP network.

2. The architecture of claim 1, wherein said dynamic external IP address assigning means further includes means for determining whether the IP address is actively being used by the subscriber equipment, and responsive to a determination that the IP address is not actively being used, determining whether the hold time has expired, and responsive to an expiration of the hold time, releasing the assigned IP address for reallocation.

3. The architecture of claim 1, wherein said dynamic external IP address assigning means is resident within said DHCP.

4. The architecture of claim 3, wherein said dynamic external IP address assigning means includes a timer for monitoring an expiration of an assigned IP address hold time.

5. The architecture of claim 4, wherein responsive to the expiration of the assigned IP address hold time, said DHCP releases the assigned external IP address for reallocation.

6. The architecture of claim 1, wherein said dynamic external IP address assigning means is resident within said GW.

7. The architecture of claim 6, wherein responsive to a request, said GW determines an assigned IP address hold time as a function of the application, further wherein said GW submits the request and the assigned IP address hold time to said DHCP.

8. The architecture of claim 7, wherein said dynamic external IP address assigning means includes a timer for monitoring an expiration of an assigned IP address hold time.

9. The architecture of claim 8, wherein responsive to the expiration of the assigned IP address hold time, said GW communicates information to said DHCP for releasing the assigned external IP address for reallocation.

10. An architecture for dynamic IP address management, comprising:
a gateway (GW) coupled between a private IP network and a public IP network;
a dynamic host configuration processor (DHCP) coupled to said GW; and
a processor, operatively coupled to said GW and said DHCP, for dynamically assigning to a private IP network subscriber equipment an external IP address and a corresponding address hold time as a function of an application to be performed and in response to a) a request for accessing the public IP network by a subscriber equipment of the private IP network to perform the application or b) a request for accessing the private IP network by an entity of the public IP network, the external IP address selected from a prescribed number of external IP addresses available to the private IP network, wherein said dynamic external IP address assigning processor is further for determining whether the IP address is actively being used by the subscriber equipment, and responsive to a determination that the IP address is not actively being used, determining whether the hold time has expired, and responsive to an expiration of the hold time, releasing the assigned IP address for reallocation.

11. A method for implementing dynamic IP address management, comprising:
providing a gateway (GW) coupled between a private IP network and a public IP network;
providing a dynamic host configuration processor (DHCP) coupled to the GW; and
providing a processor, operatively coupled to the GW and the DHCP, for dynamically assigning to a private IP network subscriber equipment an external IP address and a corresponding address hold time as a function of an application to be performed, in response to a) a request for accessing the public IP network by a subscriber equipment of the private IP network to perform the application or b) a request for accessing the private IP network by an entity of the public IP network, the external IP address selected from a prescribed number of external IP addresses available to the private IP network.

12. The method of claim 11, wherein providing the processor for dynamically assigning the external IP address and the corresponding hold time further includes determining whether the IP address is actively being used by the subscriber equipment, and responsive to a determination that the IP address is not actively being used, determining whether the hold time has expired, and responsive to an expiration of the hold time, releasing the assigned IP address for reallocation.

13. The method of claim 11, wherein the processor for dynamically assigning the external IP address is resident within the DHCP.

14. The method of claim 13, wherein the processor for dynamically assigning the external IP address includes a timer for monitoring an expiration of an assigned IP address hold time.

15. The method of claim 14, wherein responsive to the expiration of the assigned IP address hold time, the DHCP releases the assigned external IP address for reallocation.

16. The method of claim 11, wherein the processor for dynamically assigning the external IP address is resident within the GW.

17. The method of claim 16, wherein responsive to a request, the processor determines an assigned IP address hold time as a function of the application, further wherein, responsive to the request, the GW submits the request and the assigned IP address hold time to the DHCP.

18. The method of claim 17, wherein the processor for dynamically assigning the external IP address includes a timer for monitoring an expiration of an assigned IP address hold time.

19. The method of claim 18, wherein responsive to the expiration of the assigned IP address hold time, the GW communicates information to the DHCP for releasing the assigned external IP address for reallocation.

20. A method implementing dynamic IP address management, comprising:
providing a gateway (GW) coupled between a private IP network and a public IP network;
providing a dynamic host configuration processor (DHCP) coupled to the GW; and
providing a processor, operatively coupled to the GW and the DHCP, for dynamically assigning to a private IP network subscriber equipment an external IP address and a corresponding address hold time as a function of an application to be performed and in response to a) a request for accessing the public IP network by a subscriber of the private IP network to perform the application, or b) a request for accessing the private IP network by an entity of the public IP network, the external IP address selected from a prescribed number of external IP addresses available to the private IP network, wherein the processor is further for determining whether the IP address is actively being used by the subscriber equipment, and responsive to a determination that the IP address is not actively being used, determining whether the hold time has expired, and responsive to an expiration of the hold time, releasing the assigned IP address for reallocation.

21. An architecture for dynamic IP address management in an IP network, comprising:

at least one router;

a dynamic host configuration processor (DHCP) coupled to said router; and means, operatively coupled to said router and said DHCP, for dynamically assigning to a first IP network subscriber equipment an IP address and a corresponding address hold time in response to a) a request for accessing the IP network by the first subscriber equipment to perform a network application or b) a request for accessing the IP network by a second subscriber equipment for communicating with the first subscriber equipment, the IP address selected from a prescribed number of IP addresses available to the IP network.

22. The architecture of claim 21, wherein said dynamic IP address assigning means further includes means for determining whether the IP address is actively being used by the first subscriber equipment, and responsive to a determination that the IP address is not actively being used, determining whether the hold time has expired, and responsive to an expiration of the hold time, releasing the assigned IP address for reallocation.

23. The architecture of claim 21, wherein said dynamic IP address assigning means is resident within said DHCP.

24. The architecture of claim 23, wherein said dynamic IP address assigning means includes a timer for monitoring an expiration of an assigned IP address hold time.

25. The architecture of claim 24, wherein responsive to the expiration of the assigned IP address hold time, said DHCP releases the assigned IP address for reallocation.

26. The architecture of claim 21, wherein said dynamic IP address assigning means assigns the IP address hold time as a function of the network application to be performed.

27. A method for implementing dynamic IP address management in an IP network, comprising:

dynamically assigning to a first IP network subscriber equipment, via a processor operatively coupled to at least one router and a dynamic host configuration processor (DHCP), an IP address and a corresponding address hold time, in response to a) a request for accessing the IP network by the first subscriber equipment of the IP network to perform a network application or b) a request for accessing the IP network by a second subscriber equipment for communicating with the first subscriber equipment, the IP address selected from a prescribed number of IP addresses available to the IP network.

28. The method of claim 27, wherein providing the processor for dynamically assigning the IP address and the corresponding hold time further includes determining whether the IP address is actively being used by the first subscriber equipment, and responsive to a determination that the IP address is not actively being used, determining whether the hold time has expired, and responsive to an expiration of the hold time, releasing the assigned IP address for reallocation.

29. The method of claim 27, wherein the processor for dynamically assigning the IP address is resident within the DHCP.

30. The method of claim 29, wherein the processor for dynamically assigning the IP address includes a timer for monitoring an expiration of an assigned IP address hold time.

31. The method of claim 30, wherein responsive to the expiration of the assigned IP address hold time, the DHCP releases the assigned IP address for reallocation.

32. The method of claim 27, wherein the processor for dynamically assigning the IP address assigns the IP address as a function of the network application to be performed.

* * * * *